United States Patent
Li et al.

(10) Patent No.: US 10,351,769 B2
(45) Date of Patent: Jul. 16, 2019

(54) HEAVY METAL CADMIUM DEACTIVATOR FOR ACTIVATING ACTIVITY OF SULFUR-REDUCING BACTERIA IN RICE FIELD SOIL, AND APPLICATION THEREOF

(71) Applicant: GUANGDONG INSTITUTE OF ECO-ENVIRONMENTAL SCIENCE & TECHNOLOGY, Guangzhou, Guangdong (CN)

(72) Inventors: Fangbai Li, Guangzhou (CN); Chuanping Liu, Guangzhou (CN); Xiangqin Wang, Guangzhou (CN); Jiangtao Qiao, Guangzhou (CN)

(73) Assignee: GUANGDONG INSTITUTE OF ECO-ENVIRONMENTAL SCIENCE & TECHNOLOGY, Guangzhou (CN)

( * ) Notice: Subject to any disclaimer, the term of this patent is extended or adjusted under 35 U.S.C. 154(b) by 0 days.

(21) Appl. No.: 15/958,766

(22) Filed: Apr. 20, 2018

(65) Prior Publication Data

US 2018/0237693 A1 Aug. 23, 2018

Related U.S. Application Data

(63) Continuation of application No. PCT/CN2016/079112, filed on Apr. 12, 2016.

(30) Foreign Application Priority Data

Mar. 2, 2016 (CN) .......................... 2016 1 0119079

(51) Int. Cl.
| | |
|---|---|
| *A61K 9/00* | (2006.01) |
| *C09K 17/16* | (2006.01) |
| *C05G 3/04* | (2006.01) |
| *B09C 1/08* | (2006.01) |
| *B09C 1/10* | (2006.01) |
| *C09K 101/00* | (2006.01) |

(52) U.S. Cl.
CPC ................ *C09K 17/16* (2013.01); *B09C 1/08* (2013.01); *B09C 1/10* (2013.01); *C05G 3/04* (2013.01); *B09C 2101/00* (2013.01); *C09K 2101/00* (2013.01)

(58) Field of Classification Search
CPC ...................................................... C09K 17/16
See application file for complete search history.

(56) References Cited

U.S. PATENT DOCUMENTS 5,415,778 A * 5/1995 Zanin .................... C02F 1/5236
                                                                    210/631

FOREIGN PATENT DOCUMENTS

| CN | 101070528 A | 11/2007 |
| CN | 101307297 A | 11/2008 |
| CN | 104971938 A | 10/2015 |

OTHER PUBLICATIONS

Xu, Zhiwei, "Influence Factors of Humic Microbial Reduction and its Applications in Pollutants Removal," Science-Engineering (A), China Master's Theses Full-Text Database, Sep. 15, 2008, No. 09, pp. 3-25.
Chen et al., "Behavior of Chemicals in Soils and its Relation to Environmental Quality," 2002.
Wainwright, M., "Sulfur Oxidation in Soils," Advances in Agronomy, 1984, vol. 37, pp. 349-396.
Muehe et al., "Fate of Arsenic during Microbial Reduction of Biogenic versus Abiogenic As—Fe(III)-Mineral Coprecipitates," Environmental Science & Technology, 2013, vol. 47, 8297-8307.
Cooper et al., "Toxicity of copper, lead, and zinc mixtures to Ceriodaphnia dubia and Daphnia carinata," Ecotoxicology and Environmental Safety, 2009, vol. 72, pp. 1523-1528.
Xiang et al., "Characteristics of Heavy Metals in Soil Profile and Pore Water Around Hechi Antimony-Lead Smelter, Guangxi, China," Environmental Science, Jan. 2012, vol. 33, No. 1, pp. 266-272.
Tessier et al., "Sequential Extraction Procedure for the Speciation of Particulate Trace Metals," Analytical Chemistry, Jun. 1979, vol. 51, No. 7, pp. 844-851.
Liu et al., "Analysis of Soil Bacterial Diversity by Using the 16S rRNA Gene Library," Acta Microbiologica Sinica, 2008, vol. 48, No. 10, pp. 1344-1350.
Xie et al., "Characteristics of reducing U(VI) by Shewanella putrefaciens in presence of anthraguinone-2-sulfonate (AQS)," The Chinese Journal of Nonferrous Metals, Nov. 2012, vol. 22, No. 11, pp. 3285-3291.
Dec. 6, 2016 International Search Report issued in International Patent Application No. PCT/CN2016/079112.

* cited by examiner

*Primary Examiner* — Paul W Dickinson
(74) *Attorney, Agent, or Firm* — Oliff PLC

(57) ABSTRACT

A heavy metal cadmium deactivator for activating the activity of sulfur-reducing bacteria in rice field soil, and an application thereof. The deactivator is constituted by electron shuttles alone or electron shuttles and electron donors, but cannot be constituted by electron donors alone. The mass ratio of the electron donors to the electron shuttles is (1:3)-(1:8). Also, a heavy metal cadmium deactivating method for activating the activity of microorganisms in rice field soil, such as sulfur-reducing bacteria. By applying the functional deactivator to rice field soil, the activity of microorganisms, such as sulfur-reducing bacteria, can be activated, thereby accelerating the reduction process of sulfur and iron in soil to facilitate the fixation of cadmium; cadmium adsorption and accumulation in rice is reduced to achieve secure production in fields moderately or lightly polluted by cadmium.

7 Claims, 1 Drawing Sheet

Specification includes a Sequence Listing.

HEAVY METAL CADMIUM DEACTIVATOR FOR ACTIVATING ACTIVITY OF SULFUR-REDUCING BACTERIA IN RICE FIELD SOIL, AND APPLICATION THEREOF

This is a Continuation of International Application No. PCT/CN2016/079112 filed Apr. 12, 2016, which claims the benefit of Chinese Application No. 201610119079.9 filed Mar. 2, 2016. The disclosure of the prior applications is hereby incorporated by reference herein in its entirety.

FIELD OF THE INVENTION

The present invention relates to the field of environmental protection, and in particular to a heavy metal cadmium deactivator for activating the activity of sulfur-reducing bacteria in rice field soil, and an application thereof.

BACKGROUND OF THE INVENTION

In 2014, the Ministry of Environmental Protection and the Ministry of Land and Resources released the "Bulletin on the Survey of Soil Pollution in China", which indicated that the over-standard rates of five divalent cationic heavy metals such as cadmium, copper, lead, zinc and nickel in soil were 7.0%, 2.1%, 1.5%, 0.9% and 4.8%, respectively; the over-standard rate of arable land was 19.4%, which included slight pollution 13.7%, light pollution 2.8%, moderate pollution 1.8% and heavy pollution 1.1%, with cadmium, nickel, copper and lead as the main pollutants. Pollution abatement of cadmium and other heavy metals in soil is a major environmental issue facing China, especially pollution abatement of cadmium in rice field soil.

In our country, with a large area of rice field soil polluted by cadmium, it is urgent to develop a technical method that can be popularized and applied in a large area with low cost and no retarding of the farming operations, so as to reduce the content of cadmium in rice. In fact, the behavior of heavy metals such as cadmium in rice field soil is a surface process of water-soil-gas-biology interaction, which may be affected by the biogeochemical behavior of many elements. Among these elements, element sulfur is the most abundant active element in rice field soil inputted by human, and iron is the most active metal element with high abundance in rice field soil. Microorganisms are the main driving force for the morphological transformation of sulfur and iron in rice field soil and thus for the morphological changes of heavy metals. Biogeochemical cycling of sulfur and iron in rice field soil will affect the morphology and bioavailability of the heavy metal cadmium. By understanding the basic scientific problems of biogeochemistry in the cycle of the elements cadmium, sulfur and iron and developing products with application value, the mobility and bioavailability of cadmium in rice field soil can be reduced, so can be the absorption of cadmium in rice, thereby increasing the safety of rice in view of cadmium. This is a viable technical idea and also the only way for controlling cadmium pollution in large area of rice field soil in China.

Sulfur significantly affects the activity and bioavailability of the heavy metal cadmium. Sulfur, as an important active element in soil, has a very active geochemical process. Sulfur in soil has different valence states from −2 to +6, mainly including $S^{2-}$, $S^0$, $SO_4^{2-}$, $S_2O_3^{2-}$, $S_4O_6^{2-}$ and other ion forms. $SO_4^{2-}$ entering the soil is quickly reduced to $S^{2-}$ under anaerobic conditions, which can form sulfides with metal ions to stabilize heavy metals. However, when sulfur is oxidized in soil to form $SO_4^{2-}$, a large amount of H is produced, resulting in the activation of heavy metals (CHEN Huai-man et al., 2002). Therefore, the oxidation and reduction of sulfur in soil is the key mechanism to control the dissolution and precipitation of heavy metals in soil. Soil microorganisms play a central role in the sources and sinks of sulphate, and the interaction between various microorganisms is an important regulator of the content of sulfate in soil (Wainwright, 1984).

Recently Muehe et al. isolated *Geobacter* sp. strain Cd1, which could reduce and dissolve cadmium-containing iron oxide minerals, with the released Cd fixed by secondary iron oxide minerals (Muehe et al., 2013). It was indicated by this study that during the reduction of iron, the re-fixation of Cd would also be promoted due to the recrystallization of iron oxide minerals. Cooper et al. found that, in this process the free divalent heavy metals (Cd, Co, Mn, Ni, Pb and Zn) in soil could be fixed in the secondary mineral structure during the recrystallization of iron oxide to achieve the structured fixed detoxification of heavy metals (Cooper et al., 2006).

According to the above principle analysis, activation of sulfur-reducing bacteria and other microorganisms in soil can promote reduction of sulfur and iron in rice field soil, and thus get cadmium fixed. The activity of sulfur-reducing bacteria and other microorganisms in soil is related to electron donors, electron shuttles and so on in soil, and can be effectively activated by electron donors and electron shuttles added to rice field soil.

Electron donors refer to low-molecular-weight organic carbon materials required for the growth of microorganisms such as sulfur-reducing bacteria, and electron shuttles refer to carriers transporting electrons between microorganisms and minerals. Electron shuttles acquire electrons from the extracellular respiration microorganisms and are reduced, and then deliver the electrons to electron acceptors (minerals such as iron oxide) and are meanwhile oxidized, with the structure of the shuttles in this process relatively stable and not consumed. Most microorganisms that drive the reduction of iron and sulfur have the function of extracellular respiration, and thus electron shuttles can activate iron-reducing and sulfur-reducing microorganisms and meanwhile accelerate the reduction of iron and sulfur in rice field soil.

Electron shuttles include micromolecular benzoquinone-based humus having the quinonyl structure, macromolecular humus and solid humus biochar. The micromolecular benzoquinone-based humus AQDS (9,10-anthraquinone-2,6-disulfonic acid) has a standard redox potential of −0.184 V, and several other kinds of quinonyl-containing humus have a standard redox potential of about −0.5 to −0.003 V. These standard redox potential values are lower than the standard redox potential values for the reduction of nitrate, sulfate and iron. In most cases, humus and like-humus can obtain electrons earlier than nitrate, sulfate and iron oxide, and deliver the electrons they have obtained to other electron acceptors including nitrate, sulfate and iron oxide. Therefore, humus and like-humus act as electron shuttles in the biogeochemical cycle of elements. Humus, as an important part of organic matter in soil, can be divided into three relatively homogeneous components according to the solubility of humus in aqueous solution: (1) fulvic acid (FA), soluble in acid and alkali; (2) humic acid (HA), only soluble in alkali solution, and precipitated after the acidification of alkali extract; and (3) humin (HM), insoluble in acid or alkali. Humus contains in the molecular structure a large number of active functional groups, such as carboxyl, alcoholic hydroxyl and phenolic hydroxyl, and thus has a high geochemical activity and can have complexation with ions of Cu, Cd, Pd, Zn and Hg and other toxic metal ions that enter the environment. Most importantly, the quinonyl group of humus determines that the humus is a class of natural organic matter with redox activity. The solid humus biochar contains in the surface a large number of phenolic, quinonyl and aromatic groups, which are all important reaction sites involved in electron transfer. Quinonyl is the most important active site for electron transfer contributing about 70%, with the contribution of the non-quinonyl site to electron transfer about 30%.

Based on the above analysis, the electron shuttles above have the function of activating microorganisms such as sulfur-reducing bacteria and iron-reducing bacteria. By utilizing these substances to activate the activity of microorganisms such as sulfur-reducing bacteria and utilizing the coupled cadmium of the cycle of the elements sulfur and iron to fix the deactivation relationship, the technical methods and new products for reducing the mobility of cadmium in rice field soil are developed. From the biogeochemical point of view of the elemental cycle, the activity of functional microorganisms in rice field soil related to cadmium deactivation is regulated, and the mobility of cadmium in rice field soil is reduced, thus achieving the goal of abating cadmium pollution in rice field soil. These are of great significance for the abatement of heavy metal pollution in large-area farmland in our country.

CONTENTS OF THE INVENTION

In order to overcome the shortcomings and deficiencies of the prior art, a first object of the present invention is to provide a heavy metal cadmium deactivator for activating the activity of sulfur-reducing bacteria in rice field soil. This heavy metal cadmium deactivator can activate the activity of microorganisms such as sulfur-reducing bacteria in rice field soil, so as to promote the adsorption fixation and precipitation fixation of cadmium, which can effectively reduce the content of heavy metal cadmium in rice to achieve the standard production in moderately or lightly polluted rice field soil.

A second object of the present invention is to provide a method of preparing the heavy metal cadmium deactivator.

A third object of the present invention is to provide an application of the heavy metal cadmium deactivator.

A fourth object of the present invention is to provide a method of deactivating the heavy metal cadmium for activating the activity of sulfur-reducing bacteria in rice field soil, which can reduce the concentration of heavy metal cadmium in the pore water of rice field soil and promote the conversion of the exchangeable heavy metal to the fixed-state heavy metal.

The objects of the present invention are achieved through the following technical solution:

The present invention provides a heavy metal cadmium deactivator for activating the activity of sulfur-reducing bacteria in rice field soil, which is constituted by electron shuttles alone or electron shuttles and electron donors, but cannot be constituted by electron donors alone;

the heavy metal cadmium deactivator for activating the activity of sulfur-reducing bacteria in rice field soil is preferably constituted by electron donors and electron shuttles mixed together, wherein the mass ratio of the electron donors to the electron shuttles is (1:3)-(1:8);

the electron donors refer to low-molecular-weight organic carbon required for the growth of microorganisms such as sulfur-reducing bacteria;

the electron donors are preferably at least one of organic acids, alcohols, saccharides and other macromolecular carbohydrates;

the organic acids are preferably at least one of acetic acid, propionic acid, citric acid, lactic acid, tartaric acid and the like;

the alcohols are preferably at least one of ethanol, propanol and the like;

the saccharides are preferably at least one of glucose, sucrose and the like;

the other macromolecular carbohydrates are preferably at least one of starch, honey and the like;

the electron donors are more preferably at least one of acetic acid, lactic acid and glucose;

the electron shuttles are at least one of micromolecular benzoquinone-based humus, macromolecular humus and solid humus biochar;

the electron shuttles are preferably a mixture of micromolecular benzoquinone-based humus, macromolecular humus and solid humus biochar;

the mass ratio of the micromolecular benzoquinone-based humus, macromolecular humus and solid humus biochar is preferably (1:2.5:5)-(1:5:10);

the micromolecular benzoquinone-based humus is preferably anthraquinone-2,6-disulfonate; and the macromolecular humus is preferably at least one of fulvic acid, humic acid and humin.

The method of preparing the solid humus biochar comprises the following steps:

drying and crushing the biomass, raising the temperature to 300° C.-500° C. in a nitrogen atmosphere and keeping the temperature for 8-10 h, keeping the nitrogen atmosphere after stopping heating until cooling, and crushing and screening to obtain the solid humus biochar;

the biomass is at least one of roots, stems and leaves of herbs or woody plants;

after the biomass is dried and crushed, its particle size is preferably less than 5 cm;

the screening is preferably performed with a sieve of 60-200 meshes; and the solid humus biochar has the content of fixed carbon not less than 55% and a pH of 7 to 9.

The method of preparing the heavy metal cadmium deactivator for activating the activity of sulfur-reducing bacteria in rice field soil comprises the following steps: mixing the components of the heavy metal cadmium deactivator for activating the activity of sulfur-reducing bacteria in rice field soil, so as to obtain the heavy metal cadmium deactivator for activating the activity of sulfur-reducing bacteria in rice field soil;

a granulated heavy metal cadmium deactivator comprises the above-mentioned heavy metal cadmium deactivator for activating the activity of sulfur-reducing bacteria in rice field soil and a binder.

The method of preparing the granulated heavy metal cadmium deactivator preferably comprises the following steps:

wrapping the heavy metal cadmium deactivator for activating the activity of sulfur-reducing bacteria in rice field soil with the binder for granulation to obtain the granulated heavy metal cadmium deactivator;

the particle size of the granulated heavy metal cadmium deactivator is preferably 3-5 mm;

the binder is preferably at least one of lignin, starch and dextrin, chitin and chitosan, collagen and gelatin, silk and alginate, and other biopolymer materials, and the mass ratio of the binder to the heavy metal cadmium deactivator for activating the activity of sulfur-reducing bacteria in rice field soil is (1:30)-(1:150), preferably (1:80)-(1:110); and the heavy metal cadmium deactivator for activating the activity of sulfur-reducing bacteria in rice field soil or the granulated heavy metal cadmium deactivator is applied to the technical field of heavy metal pollution abatement.

A method of deactivating heavy metal cadmium for activating the activity of sulfur-reducing bacteria in rice field soil comprises the following steps:

the above heavy metal cadmium deactivator is mixed with other fertilizers and then applied together, and may also be applied separately, preferably separately;

the heavy metal cadmium deactivator may be applied as a base fertilizer 5 to 10 days prior to rice transplanting or as an additional fertilizer during rice tillering and rice field sunning, or may be applied in both periods;

the dosage of the heavy metal cadmium deactivator is 50-300 kg/mu; it is further preferable that the dosage is 50-150 kg/mu for the abatement of lightly cadmium-polluted rice field soil (the content of cadmium in soil is less than or equal to 1.0 mg/kg, and the content of cadmium in rice is less than or equal to 0.4 mg/kg) according to the degree of cadmium pollution; the dosage is 100-300 kg/mu for the abatement of moderately cadmium-polluted rice field soil (the content of cadmium in soil is less than or equal to 1.0 mg/kg, and the content of cadmium in rice is less than or equal to 0.4-0.6 mg/kg); and the heavy metal cadmium deactivator is preferably the granulated heavy metal cadmium deactivator.

The heavy metal cadmium deactivator may be applied as a base fertilizer 5 to 10 days prior to rice transplanting preferably according to the following steps: the rice field needs to be raked evenly for the application of the heavy metal cadmium deactivator prior to rice transplanting; after the heavy metal cadmium deactivator was applied, the flooding of rice field should be kept over 3 cm and maintained for more than 15 days.

The heavy metal cadmium deactivator may be applied as an additional fertilizer during rice tillering and rice field sunning preferably according to the following steps: sprinkling the heavy metal cadmium deactivator as far as possible around the rice roots instead of on the leaves, and meanwhile not over drying the soil, so as to ensure that the moisture content in soil was greater than 70% of the saturated moisture content; timely irrigation was necessary when the moisture content in soil was insufficient; after the heavy metal cadmium deactivator was applied, the rice field should be irrigated to over 5 cm in flooding within 3 days and kept flooded for more than 5 days.

The principle of the present invention is as follows: The present invention provides a heavy metal cadmium deactivator that is applied to rice field soil to activate the activity of microorganisms such as sulfur-reducing bacteria, which can significantly activate the activity of microorganisms such as sulfur-reducing bacteria after its application so as to accelerate the reduction process of sulfur and iron in soil, with the coupled cadmium fixed in this process; the content of cadmium in the soil pore water is reduced, so is the concentration of exchangeable cadmium, and the conversion of cadmium to a fixed state is promoted, thus reducing the absorption and accumulation of cadmium in rice. The mechanism of deactivating cadmium includes: (1) the mechanisms of reduction of humus, reduction of coupled sulfate, and fixation of cadmium, wherein the reduction of humus promotes the reduction of sulfate in rice field soil into $S^{2-}$, which promotes the formation of cadmium sulfide minerals to facilitate the fixation of cadmium; and (2) the mechanisms of reduction of humus, reduction of coupled iron, and fixation of cadmium. With humus reduced by microorganisms, reduced humus transfers electrons to iron oxide, which can significantly increase the rate of reduction of iron by microorganisms. Iron oxide is reduced and dissolved, which is followed by the secondary mineralization process accompanied by the fixation of cadmium. In addition, in the present invention, the deactivator is applied by a specific technique, including the manner of application of the functional deactivator, the period of application, the dosage of application and precautions during application, etc., further activating the activity of microorganisms such as sulfur-reducing bacteria and reducing the absorption and accumulation of cadmium in rice.

The present invention has the following advantages and effects with respect to the prior art:

(1) The present invention provides a heavy metal cadmium deactivator for activating the activity of microorganisms such as sulfur-reducing bacteria, which can significantly activate the activity of microorganisms such as sulfur-reducing bacteria so as to accelerate the reduction process of sulfur and iron in soil, with the coupled cadmium fixed in this process; the content of cadmium in the soil pore water is reduced, so is the concentration of exchangeable cadmium, and the conversion of cadmium to a fixed state is promoted, thus reducing the absorption and accumulation of cadmium in rice.

(2) Compared with the deactivation technology based on acid-base neutralization, adsorption fixation and the like, the present invention is based on the principle of regulation of functional microorganisms of sulfur-reducing bacteria and iron-reducing bacteria, and thus the application of a small amount of the deactivator provided by the present invention can achieve the goal of regulating the activity of sulfur-reducing bacteria functional microorganisms so as to deactivate cadmium; for moderately or lightly cadmium-polluted rice field soil, the heavy metal cadmium deactivator provided by the present invention is only used in an amount of 50-300 kg/mu, much lower than the amount of deactivator required for adsorption-based fixation, which reduces the cost of abatement.

(3) In view of the dependence of different microorganisms such as sulfur-reducing bacteria on the low-molecular-weight organic carbon source, the present invention determines the composition of electron donors and the optimized combination of electron donors and electron shuttles to obtain the heavy metal cadmium deactivator, with the purpose of developing the efficacy of the activated sulfur-reducing bacteria. After application of the heavy metal cadmium deactivator, the activity of functional microorganisms in soil will be maintained at a relatively high level for a long time, and thus the deactivation effect is more durable.

(4) The heavy metal cadmium deactivator provided by the present invention has a wide range of sources, allows simple preparation and is easy for large-scale factory production.

(5) The method for deactivating cadmium in rice field soil provided by the present invention, easy to be popularized in a large area without retarding the farming operations, is a technical method of deactivating heavy metal cadmium in rice field soil, effectively reducing the content of heavy metals such as cadmium in rice, and achieving the secure standard production in rice field soil lightly polluted by heavy metals such as cadmium.

DETAILED DESCRIPTION OF THE EMBODIMENTS

Figure 1:
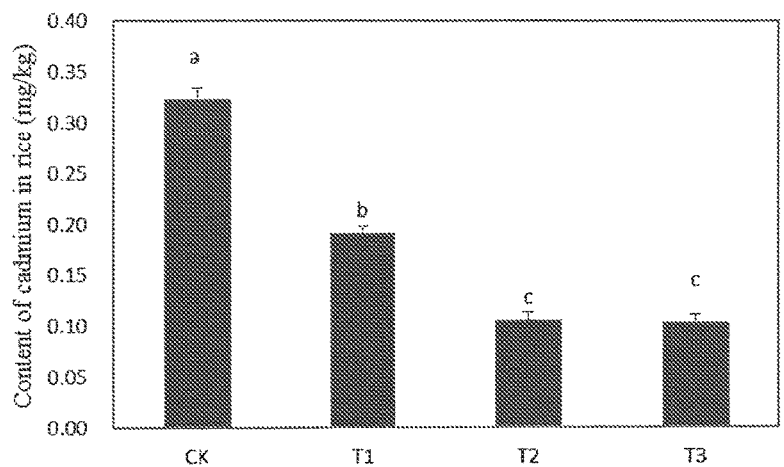
FIG. 1 shows the analysis of field test measurement results of the content of cadmium in rice after different heavy metal cadmium deactivators were applied to the lightly cadmium-polluted rice field soil.

The present invention will be further described below in detail with reference to examples and drawings; however, the embodiments of the present invention are not limited thereto.

Example 1: Preparation Process of Electron-Shuttle Functional Deactivator

Mixing the micromolecular benzoquinone-based humus AQDS (anthraquinone-2,6-sodium disulfonate), macromolecular humus (a mixture of fulvic acid and humic acid in a mass ratio of 1:1), and solid humus biochar uniformly in a mass ratio of 1:5:10 to obtain the heavy metal cadmium deactivator for activating the activity of sulfur-reducing bacteria in rice field soil. Wherein the solid humus biochar is prepared by the following process: drying rice straw and crushing it into segments less than 5 cm in length, raising the temperature to 300° C. in a nitrogen atmosphere and keeping the temperature for 10 h, keeping the nitrogen atmosphere after stopping heating until cooling to room temperature, crushing and then screening with a 60-mesh sieve to obtain the solid humus biochar having the content of fixed carbon of 58.2% and a pH of 8.1.

Example 2: Preparation Process of Heavy Metal Cadmium Deactivator with Both Electron Donors and Electron Shuttles (1) Mixing ethanol, lactic acid, glucose and starch uniformly in a mass ratio of 1:1:2:1 to obtain electron donors;

(2) mixing the micromolecular benzoquinone-based humus AQDS (anthraquinone-2,6-sodium disulfonate), macromolecular humus humin, and solid humus biochar uniformly in a mass ratio of 1:2.5:5 to obtain electron shuttles;

(3) mixing the electron donors obtained in the step (1) and the electron shuttles obtained in the step (2) uniformly in a mass ratio of 1:3 to obtain the heavy metal cadmium deactivator for activating the activity of sulfur-reducing bacteria in rice field soil (the heavy metal cadmium deactivator with both electron donors and electron shuttles); wherein the solid humus biochar is prepared by the following process: drying palm filaments and crushing them into segments less than 5 cm in length, raising the temperature to 500° C. in a nitrogen atmosphere and keeping the temperature for 8 h, keeping the nitrogen atmosphere after stopping heating until cooling to room temperature, crushing and then screening with a 200-mesh sieve to obtain the solid humus biochar having the content of fixed carbon of 67.7% and a pH of 8.8.

Example 3: Preparation Process of Granulated Heavy Metal Cadmium Deactivator with Both Electron Donors and Electron Shuttles (1) Mixing acetic acid, lactic acid and glucose uniformly in a mass ratio of 1:1:2 to obtain electron donors;

(2) mixing the micromolecular benzoquinone-based humus AQDS (anthraquinone-2,6-sodium disulfonate), macromolecular humus (a mixture of fulvic acid, humic acid and humin in a mass ratio of 1:1:1), and solid humus biochar uniformly in a mass ratio of 1:4:8 to obtain electron shuttles;

(3) mixing the electron donors obtained in the step (1) and the electron shuttles obtained in the step (2) uniformly in a mass ratio of 1:8 to obtain the heavy metal cadmium deactivator for activating the activity of sulfur-reducing bacteria in rice field soil (the heavy metal cadmium deactivator with both electron donors and electron shuttles); wherein the solid humus biochar is prepared by the following process: drying palm filaments and corn stalks and crushing them into segments less than 5 cm in length, mixing them in a mass ratio of 1:1, raising the temperature to 450° C. in a nitrogen atmosphere and keeping the temperature for 8 h, keeping the nitrogen atmosphere after stopping heating until cooling to room temperature, crushing and then screening with a 100-mesh sieve to obtain the solid humus biochar having the content of fixed carbon of 60.5% and a pH of 8.3;

(4) granulation: mixing chitosan, gelatin, dextrin and starch uniformly in a mass ratio of 1:1:1:5 to obtain a binder; mixing the binder and the powdered heavy metal cadmium deactivator obtained in the step (3) uniformly in different mass ratios, then sprinkling the above mixture with water in a mass percentage of 35% for extrusion granulation, and drying to obtain the granulated heavy metal cadmium deactivator; wherein the mass ratio of the binder to the powdered heavy metal cadmium deactivator obtained in the step (3) was respectively 1:30, 1:150 and 1:100, and the particle size of the granulated heavy metal cadmium deactivator was respectively 4.5±0.5 mm, 3.5±0.5 mm and 4±0.5 mm.

Example 4: Pot Experiment on the Effect of Heavy Metal Cadmium Deactivator on Activating of the Activity of Microorganisms Such as Sulfur-Reducing Bacteria Soil samples were collected from the rice field soil polluted by arsenic and cadmium in Shantou City, Guangdong Province. After the soil samples were naturally dried, the impurities were removed and ground and then screened with a 100-mesh sieve. Flooding for 2 weeks prior to use to activate the activity of microorganisms in soil. It was determined that the soil pH was 7.3, and the contents of other elements were as follows: TOC 13.1 g/kg, CEC 11.5 mol(+)/kg, total cadmium 2.01 mg/kg, total iron 30.5 g/kg, AM-Fe 0.403 g/kg, DCB-Fe 17.3 g/kg, Ca 5.56 g/kg, Mg 4.06 g/kg, and K 13.9 g/kg.

Test treatment: Loading each pot with soil 10 kg, and performing the following treatment, respectively: (1) a control pot without application of any heavy metal cadmium deactivator (CK), (2) applying 100 g/pot of the heavy metal cadmium deactivator of Example 1 (T1), (3) applying 100 g/pot of the heavy metal cadmium deactivator of Example 2 (T2), and (4) applying 100 g/pot of the heavy metal cadmium deactivator of Example 3 with a particle size of 4±0.5 mm (T3); setting three replicates for each process, and planting rice 10 days after application of various heavy metal cadmium deactivators; at 35 days of rice growth, collecting pore water in soil and determining the content of cadmium therein according to the method of XIANG Meng et al. (XIANG Meng, ZHANG Guo-ping, L I Ling, et al., *Characteristics of Heavy Metals in Soil Profile and Pore Water Around Hechi Antimony-Lead Smelter, Guangxi, China* [J], Environmental Science, 2012, 33 (1): 266-272), sampling the pore water in soil with Rhizon, a soil pore water sampling device produced by the EIJKELKAMP company in the Netherlands to analyze the content of cadmium in pore water, collecting soil samples according to the method of Tessier et al. (Tessier A, Campbell P G C, Bisson M. *Sequential Extraction Procedure for the Speciation of Particulate Trace Metals* [J], Analytical Chemistry, 1979, 51(7): 844-851) and extracting exchangeable cadmium by using 1 mol $L^{-1}$ $MgCl_2$ (pH 7.0), high-throughput sequencing cDNA samples from soil by using the 16S rRNA sequencing technology with reference to the method of LIU Wei-qi et al. (LIU Wei-qi, MAO Zhen-chuan, YANG Yu-hong, et al. *Analysis of Soil Bacterial Diversity by Using the 16S rRNA Gene Library* [J], Acta Microbiologica Sinica, 2008, 48(10):1344-1350), and determining the structure of soil microbial community; determining the activity of sulfur-reducing bacteria and iron-reducing bacteria by the reverse transcription fluorescence quantitative (RT-qPCR) technology; collecting rice samples at rice harvest, and analyzing the content of cadmium in grains.

As shown in FIG. 1, all the detected active sulfate-reducing bacteria in the potting soil belong to proteobacter and deltaproteobacteria, of which desulfuromonadales, desulfobulbaceae and desulfovibionales are dominant active sulfate-reducing microorganisms. The use of various heavy metal cadmium deactivators prepared in Examples 1-3 can significantly increase the abundance of sulfur-reducing bacteria community. Compared with the control, after application of the heavy metal cadmium deactivator prepared in Examples 1-3, the abundance of desulfobacterales microorganisms was increased by 9.89, 10.39 and 10.93 times, respectively, the abundance of desulfovibrionales microorganisms was increased by 9.25, 13.75 and 21.25 times, respectively, and the abundance of desulfuromonales microorganisms was increased by 1.98, 2.91 and 6.52 times, respectively. In order to further clarify the effect of various heavy metal cadmium deactivators prepared in Examples 1-3 on the activity of microorganisms such as sulfur-reducing bacteria, the transcriptional copies of the sulfur-reducing bacteria, including desulfobacter, desulfovibrio and desulfuromonas, and iron-reducing bacteria, including *geobacter* and *shewanella* were quantitatively analyzed by the reverse transcription fluorescence quantitative (RT-qPCR) technology. Shown in Table 2 are the fluorescence quantification results of *geobacter* (identification primers: Geo494F: 5'-AGGAAGCACCGGCTAACTCC-3' and Geo825R: 5'-TACCCGCRACACCTAGTTCT-3'), *shewanella* (identification primers: She120F: 5'-GCCT AGGGATCTGCCCA-GTCG-3' and She220R: 5'-CTAGGTTCATCCAATCGCG-3'), desulfobacter (identified primers: DSB127F: 5'-GATAATCTGCCTTCAAGCCTGG-3' and DSB1273R: 5'-CYYYYYGCRRAGTCGSTGCCCT-3'), desulfovibrio (identification primers: DSV691-F: 5'-CCGTAGATATCTG-GAGGAACATCAG-3' and DSV826-R: 5'-ACATCTAG-CATCCATCGTTTACAGC-3'), and desulfuromonas (identification primers: 5'-AACCTTCGGGTCCTACTGTC-3' and DSF1033R: 5'-GCCGAACTGAC CCCTATGTT-3'). The total bacterial transcriptional activity was significantly increased (p<0.05) after the application of various heavy metal cadmium deactivators prepared in Examples 1-3, indicating that the addition of heavy metal cadmium deactivators promoted the growth and transcription of microorganisms in soil. The use of various heavy metal cadmium deactivators prepared in Examples 1-3 could significantly increase the activity of sulfur-reducing bacteria community; compared with the control, after application of the heavy metal cadmium deactivators prepared in Examples 1-3, the transcriptional copies of desulfobacter were increased by 2.59, 3.24 and 4.23 times, respectively, the transcriptional copies of desulfovibrio were increased by 2.76, 5.59 and 11.41 times, respectively, the transcriptional copies of desulfuromonas were increased by 3.18, 8.13 and 9.63 times, respectively, the transcriptional copies of *geobacter* were increased by 2.84, 6.32 and 7.29 times, respectively, and the transcriptional copies of *shewanella* were increased by 3.75, 7.23 and 8.02 times, respectively. These further demonstrated that all the heavy metal cadmium deactivators prepared in Examples 1-3 could activate the active transcriptional levels of functional microorganisms such as sulfur-reducing bacteria and iron-reducing bacteria, with the heavy metal cadmium deactivators prepared in Example 3 having the best effect on the activation of functional microorganisms such as sulfur-reducing bacteria and iron-reducing bacteria.

TABLE 1

Effect of different heavy metal cadmium deactivators on abundance of sulfur-reducing bacteria community in soil (%)

|  | Desulfobulbaceas | Desulfovibrionales | Desulfuromonadales |
|---|---|---|---|
| CK | 0.28 ± 0.01b | 0.04 ± 0.01d | 0.44 ± 0.01d |
| T1 | 3.05 ± 0.42a | 0.41 ± 0.006c | 1.31 ± 0.12c |
| T2 | 3.19 ± 0.77a | 0.59 ± 0.01b | 1.72 ± 0.09b |
| T3 | 3.34 ± 0.35a | 0.89 ± 0.001a | 3.31 ± 0.67a |

TABLE 2

Fluorescence quantitation of total soil bacteria, *desulfobacter*, *desulfovibrio*, *desulfuromonas*, *geobacter* and *shewanella* after application of different heavy metal cadmium deactivators

|  | 16S rRNA ($10^{10}$ $g^{-1}$soil) | *Desulfobacter* ($10^8$ $g^{-1}$soil) | *Desulfovibrio* ($10^8$ $g^{-1}$soil) | *Desulfuromonas* ($10^8$ $g^{-1}$soil) | *Geobacter* ($10^8$ $g^{-1}$soil) | *Shewanella* ($10^8$ $g^{-1}$soil) |
|---|---|---|---|---|---|---|
| CK | 0.957 ± 0.123c | 1.06 ± 0.06c | 0.17 ± 0.006c | 1.27 ± 0.03d | 1.22 ± 0.13d | 0.52 ± 0.05c |
| T1 | 6.16 ± 0.12b | 3.81 ± 0.48b | 0.64 ± 0.09c | 5.31 ± 0.28c | 4.69 ± 0.20c | 2.47 ± 0.12b |
| T2 | 12.3 ± 1.40a | 4.49 ± 0.15a | 1.12 ± 0.07b | 11.6 ± 0.51b | 8.93 ± 0.07b | 4.28 ± 0.20a |
| T3 | 14.6 ± 0.23a | 5.54 ± 0.98a | 2.11 ± 0.24a | 13.5 ± 2.99a | 10.11 ± 0.07a | 4.69 ± 0.20a |

Application of various heavy metal cadmium deactivators not only activated the activity of functional microorganisms such as sulfur-reducing bacteria and iron-reducing bacteria in soil, but also reduced the content of cadmium in soil pore water, so that the exchangeable Cd in soil was converted to the fixed-state Cd. As shown in Table 3, compared with the control, the contents of cadmium in soil pore water decreased by 42.7%, 46.7% and 55.5%, respectively, after application of the heavy metal cadmium deactivators prepared in Examples 1-3. As shown in Table 4, compared with the control, the concentration of exchangeable Cd in rhizosphere soil decreased by 45.6%, 57.8% and 66.8%, respectively, after application of the heavy metal cadmium deactivators prepared in Examples 1-3. Therefore, the content of cadmium in potted rice can also be reduced after the application of various heavy metal cadmium deactivators. As shown in Table 5, compared with the control, the contents of cadmium in rice decreased by 45.8%, 63.2% and 69.1%, respectively, after application of the heavy metal cadmium deactivators prepared in Examples 1-3; in the polluted soil with total cadmium of 2.01 mg/kg, the content of cadmium in rice after application of the heavy metal cadmium deactivators prepared in Example 3 decreased from 0.575 mg/kg to 0.192 mg/kg, reaching the requirements of food hygiene standards. The above results indicate that application of the heavy metal cadmium deactivators prepared in Examples 1-3 can activate the activity of functional microorganisms such as sulfur-reducing bacteria in soil, and reduce the mobility of cadmium in rice field soil, thereby achieving the purpose of reducing the content of cadmium in rice.

TABLE 3

Efficacy of different heavy metal cadmium deactivators on the concentration of cadmium in soil pore water in pot experiments ($\mu g\ L^{-1}$)

| | Parallel 1 | Parallel 2 | Parallel 3 | Average value | Decreased value compared with the control (%) |
|---|---|---|---|---|---|
| CK | 0.411 | 0.432 | 0.452 | 0.432a | |
| T1 | 0.278 | 0.223 | 0.241 | 0.247b | 42.7 |
| T2 | 0.199 | 0.224 | 0.267 | 0.230b | 46.7 |
| T3 | 0.179 | 0.169 | 0.228 | 0.192b | 55.5 |

TABLE 4

Change of concentration of the exchangeable Cd in rhizosphere soil after application of different heavy metal cadmium deactivators ($mg\ kg^{-1}$)

| | Parallel 1 | Parallel 2 | Parallel 3 | Average value | Decreased value compared with the control (%) |
|---|---|---|---|---|---|
| CK | 0.455 | 0.432 | 0.412 | 0.433a | |
| T1 | 0.225 | 0.254 | 0.228 | 0.236b | 45.6 |
| T2 | 0.195 | 0.176 | 0.177 | 0.183c | 57.8 |
| T3 | 0.132 | 0.142 | 0.157 | 0.144d | 66.8 |

TABLE 5

Changes of concentration of Cd in rice after application of different heavy metal cadmium deactivators ($mg\ kg^{-1}$)

| | Parallel 1 | Parallel 2 | Parallel 3 | Average value | Decreased value compared with the control (%) |
|---|---|---|---|---|---|
| CK | 0.543 | 0.601 | 0.582 | 0.575a | |
| T1 | 0.319 | 0.296 | 0.321 | 0.312b | 45.8 |
| T2 | 0.204 | 0.221 | 0.211 | 0.212c | 63.2 |
| T3 | 0.177 | 0.189 | 0.167 | 0.178d | 69.1 |

Example 5: Field Experiments of Reduction of the Content of Cadmium in Rice by the Heavy Metal Cadmium Deactivators Applied in Lightly Polluted Soil Test time: Transplanting on Apr. 7, 2014, and harvesting on July 2, with the test performed in a cadmium-polluted farmland in Zhangshi Town, Qujiang District, Shaoguan City, Guangdong Province; the farmland soil had a pH of 5.32 and a total Cd content of 0.545 $mg/kg^{-1}$. The test included the following treatments: (1) Blank control (CK). (2) One-time applying 100 kg/mu of the heavy metal cadmium deactivators with a particle size of 4±0.5 mm prepared in Example 3 ten days prior to rice transplanting (T1); it was necessary to rake the rice field uniformly prior to the application and apply the above heavy metal cadmium deactivators together with other conventional fertilizers; after application of the heavy metal cadmium deactivators, it was necessary for the rice field to be kept flooded more than 3 cm for more than 15 days. (3) One-time applying 150 kg/mu of the heavy metal cadmium deactivators with a particle size of 4±0.5 mm prepared in Example 3 ten days prior to rice transplanting (T2); it was necessary to rake the rice field uniformly prior to the application and apply the above heavy metal cadmium deactivators together with other conventional fertilizers; after application of the functional deactivators, it was necessary for the rice field to be kept flooded more than 3 cm for more than 15 days. (4) Applying 50 kg/mu of the heavy metal cadmium deactivators with a particle size of 4±0.5 mm prepared in Example 3 five days prior to rice transplanting; applying 50 kg/mu of the heavy metal cadmium deactivators with a particle size of 4±0.5 mm prepared in Example 3 during rice tillering and rice field sunning (T3); prior to transplanting, it was necessary to rake the rice field uniformly during the application and apply the above heavy metal cadmium deactivators together with other conventional fertilizers; after application of the heavy metal cadmium deactivators, it was necessary for the rice field to be kept flooded more than 3 cm for more than 15 days. In applying the heavy metal cadmium deactivators during rice tillering and rice field sunning, applying the heavy metal cadmium deactivator alone and sprinkling it as far as possible around the rice roots instead of on the leaves, and meanwhile not over drying the soil, so as to ensure that the moisture content in soil was greater than 70% of the saturated moisture content; timely irrigation was necessary when the moisture content in soil was insufficient; after the heavy metal cadmium deactivator was applied, the rice field should be irrigated to over 5 cm in flooding within 3 days and kept flooded for more than 5 days. Three replicates were provided for each treatment, and randomly arranged; there were totally nine test areas, each having an area of 5*64=30 m² so as to ensure independent irrigation and drainage.

As shown in FIG. 1, all the treatments could effectively reduce the content of cadmium in rice under field conditions; compared with the control, the content of cadmium decreased by 41.0% after one-time application of 100 kg/mu of the heavy metal cadmium deactivator prepared in Example 3 ten days prior to transplanting, the content of cadmium decreased by 67.1% after one-time application of 150 kg/mu of the heavy metal cadmium deactivator prepared in Example 3 ten days prior to transplanting, and the content of cadmium decreased by 68.0% after application of 50 kg/mu of the heavy metal cadmium deactivator prepared in Example 3 five days prior to rice transplanting and during rice tillering and rice field sunning, with the three treatments having the results of 0.191 mg/kg, 0.106 mg/kg and 0.103 mg/g, respectively, all achieving the food safety standards. The results show that the application of the heavy metal cadmium deactivator prepared in Example 3 can produce qualified rice on slightly polluted farmland, wherein it is most economical and efficient to reduce the content of cadmium in rice by applying 50 kg/mu of the heavy metal cadmium deactivator prepared in Example 3 five days prior to rice transplanting and during rice tillering and rice field sunning.

Example 6: Field Experiments of Reduction of the Content of Cadmium in Rice by the Heavy Metal Cadmium Deactivators Applied in Moderately Polluted Soil Test time: Transplanting on Jul. 16, 2014, and harvesting on November 3, with the test performed in a cadmium-polluted rice field in Baitu Town, Qujiang District, Shaoguan City, Guangdong Province; collecting and analyzing the surface soil (0-30 cm) of this rice field to find that the soil had the pH of about 6.51 and the content of Cd of 0.815 mg $kg^{-1}$. The test included the following treatments: (1) Blank control (CK). (2) One-time applying 200 kg/mu of the heavy metal cadmium deactivators with a particle size of 4±0.5 mm prepared in Example 3 ten days prior to rice transplanting (T1); it was necessary to rake the rice field uniformly prior to the application and apply the above heavy metal cadmium deactivators together with other conventional fertilizers; after application of the heavy metal cadmium deactivators, it was necessary for the rice field to be kept flooded more than 3 cm for more than 15 days. (3) One-time applying 300 kg/mu of the heavy metal cadmium deactivators with a particle size of 4±0.5 mm prepared in Example 3 ten days prior to rice transplanting (T2); it was necessary to rake the rice field uniformly prior to the application and apply the above heavy metal cadmium deactivators together with other conventional fertilizers; after application of the heavy metal cadmium deactivators, it was necessary for the rice field to be kept flooded more than 3 cm for more than 15 days. (4) Applying 100 kg/mu of the heavy metal cadmium deactivators with a particle size of 4±0.5 mm prepared in Example 3 five days prior to rice transplanting, and additionally applying 100 kg/mu of the heavy metal cadmium deactivators prepared in Example 3 during rice tillering and rice field sunning (T3); prior to transplanting, it was necessary to rake the rice field uniformly during the application and apply the above heavy metal cadmium deactivators together with other conventional fertilizers; after application of the heavy metal cadmium deactivators, it was necessary for the rice field to be kept flooded more than 3 cm for more than 15 days. In applying the heavy metal cadmium deactivators during rice tillering and rice field sunning, applying the heavy metal cadmium deactivator alone and sprinkling it as far as possible around the rice roots instead of on the leaves, and meanwhile not over drying the soil, so as to ensure that the moisture content in soil was greater than 70% of the saturated moisture content; timely irrigation was necessary when the moisture content in soil was insufficient; after the heavy metal cadmium deactivator was applied, the rice field should be irrigated to over 5 cm in flooding within 3 days and kept flooded for more than 5 days. Three replicates were provided for each treatment, and randomly arranged; there were totally nine test areas, each having an area of 5*64=30 $m^2$ so as to ensure independent irrigation and drainage.

Figure 2:
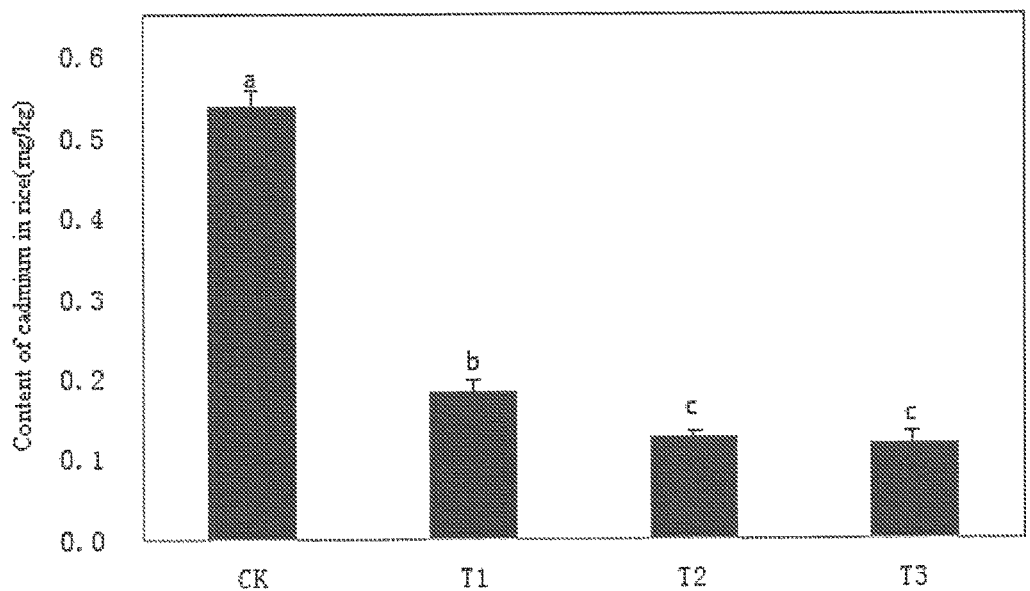
FIG. 2 shows the analysis of field test measurement results of the content of cadmium in rice after different heavy metal cadmium deactivators were applied to the moderately cadmium-polluted rice field soil.

As shown in FIG. 2, all the treatments could effectively reduce the content of cadmium in rice under field conditions; compared with the control, the content of cadmium decreased by 42.9% after one-time application of 200 kg/mu of the heavy metal cadmium deactivator prepared in Example 3 ten days prior to transplanting, the content of cadmium decreased by 60.4% after one-time application of 300 kg/mu of the functional deactivator prepared in Example 3 ten days prior to transplanting, and the content of cadmium decreased by 62.6% after application of 100 kg/mu of the heavy metal cadmium deactivator prepared in Example 3 five days prior to rice transplanting and during rice tillering and rice field sunning, with the three treatments having the results of 0.184 mg/kg, 0.128 mg/kg and 0.121 mg/g, respectively, all achieving the food safety standards. The results show that the application of the heavy metal cadmium deactivator prepared in Example 3 can produce qualified rice on moderately polluted farmland, wherein it is most economical and efficient to reduce the content of cadmium in rice by applying 100 kg/mu of the heavy metal cadmium deactivator prepared in Example 3 five days prior to rice transplanting and during rice tillering and rice field sunning.

The above examples are preferred embodiments of the present invention; however, the embodiments of the present invention are not limited thereto, and any other alteration, modification, substitution, combination and simplification made without departing from the spiritual essence and principle of the present invention are equivalent replacements and fall within the scope of protection of the present invention.

What is claimed is:

1. A heavy metal cadmium deactivator for activating activity of sulfur-reducing bacteria in rice field soil comprising:
   electron shuttles and electron donors, wherein
      the electron donors are at least one of acetic acid, lactic acid and glucose; and
      the electron shuttles are a mixture of micromolecular benzoquinone-based humus, macromolecular humus and solid humus biochar.

2. The heavy metal cadmium deactivator for activating the activity of sulfur-reducing bacteria in rice field soil according to claim 1, wherein:
   the mass ratio of the electron donors to the electron shuttles is (1:3)-(1:8).

3. The heavy metal cadmium deactivator for activating the activity of sulfur-reducing bacteria in rice field soil according to claim 1, wherein:
   the mass ratio of the micromolecular benzoquinone-based humus, macromolecular humus and solid humus biochar is (1:2.5:5)-(1:5:10).

4. The heavy metal cadmium deactivator for activating the activity of sulfur-reducing bacteria in rice field soil according to claim 1, wherein:
   a method of preparing the solid humus biochar comprises:
   drying and crushing the biomass,
   heating the biomass to 300° C.-500° C. in a nitrogen atmosphere and keeping the temperature in the range of 300° C.-500° C. for 8-10 h,
   keeping the nitrogen atmosphere after stopping the heating until cooling, and
   crushing and screening the heated biomass to obtain the solid humus biochar.

5. A granulated heavy metal cadmium deactivator, comprising the heavy metal cadmium deactivator according to claim 1 wrapped by a binder, wherein
   the particle size of the granulated heavy metal cadmium deactivator is 3-5 mm;
   the binder is at least one of lignin, starch and dextrin, chitin and chitosan, collagen and gelatin, silk and alginate; and
   the mass ratio of the binder to the heavy metal cadmium deactivator is (1:30)-(1:150).

6. A method of deactivating heavy metal cadmium for activating the activity of sulfur-reducing bacteria in rice field soil comprising:
   applying the heavy metal cadmium deactivator according to claim 1 or a granulated heavy metal cadmium deactivator comprising the heavy metal cadmium deactivator wrapped by a binder alone or together with other fertilizers after being mixed, wherein
   the particle size of the granulated heavy metal cadmium deactivator is 3-5 mm;
   the binder is at least one of lignin, starch and dextrin, chitin and chitosan, collagen and gelatin, silk and alginate; and
   the mass ratio of the binder to the heavy metal cadmium deactivator is (1:30)-(1:150).

7. The method of deactivating the heavy metal cadmium for activating the activity of sulfur-reducing bacteria in rice field soil according to claim 6, wherein:
   the heavy metal cadmium deactivator is applied as a base fertilizer 5 to 10 days prior to rice transplanting by a method comprising:
   raking the rice field evenly for the application of the heavy metal cadmium deactivator before rice transplanting;
   after application of the heavy metal cadmium deactivator, keeping the rice field flooded more than 3 cm for more than 15 days; and/or
   the heavy metal cadmium deactivator is applied as an additional fertilizer during rice tillering and rice field sunning by a method comprising:
   sprinkling the heavy metal cadmium deactivator around the rice roots, and meanwhile not over drying the soil, so as to ensure that the moisture content in the soil is greater than 70% of the saturated moisture content;
   irrigating the rice field when the moisture content in the soil is 70% or less of the saturated moisture content; and
   after the heavy metal cadmium deactivator is applied, irrigating the rice field to over 5 cm in flooding within 3 days and keeping it flooded for more than 5 days;
   the dosage of the heavy metal cadmium deactivator is 50-300 kg/mu.

* * * * *

SEQUENCE LISTING

<160> NUMBER OF SEQ ID NOS: 10

<210> SEQ ID NO 1
<211> LENGTH: 20
<212> TYPE: DNA
<213> ORGANISM: Artificial Sequence
<220> FEATURE:
<223> OTHER INFORMATION: Primer Geo494F

<400> SEQUENCE: 1
aggaagcacc ggctaactcc                                          20

<210> SEQ ID NO 2
<211> LENGTH: 20
<212> TYPE: DNA
<213> ORGANISM: Artificial Sequence
<220> FEATURE:
<223> OTHER INFORMATION: Primer Geo825R

<400> SEQUENCE: 2
tacccgcrac acctagttct                                              20

<210> SEQ ID NO 3
<211> LENGTH: 21
<212> TYPE: DNA
<213> ORGANISM: Artificial Sequence
<220> FEATURE:
<223> OTHER INFORMATION: Primer She120F

<400> SEQUENCE: 3
gcctagggat ctgcccagtc g                                            21

<210> SEQ ID NO 4
<211> LENGTH: 19
<212> TYPE: DNA
<213> ORGANISM: Artificial Sequence
<220> FEATURE:
<223> OTHER INFORMATION: Primer She220R

<400> SEQUENCE: 4
ctaggttcat ccaatcgcg                                               19

<210> SEQ ID NO 5
<211> LENGTH: 22
<212> TYPE: DNA
<213> ORGANISM: Artificial Sequence
<220> FEATURE:
<223> OTHER INFORMATION: Primer DSB127F

<400> SEQUENCE: 5
gataatctgc cttcaagcct gg                                           22

<210> SEQ ID NO 6
<211> LENGTH: 22
<212> TYPE: DNA
<213> ORGANISM: Artificial Sequence
<220> FEATURE:
<223> OTHER INFORMATION: Primer DSB1273R

<400> SEQUENCE: 6
cyyyyygcrr agtcgstgcc ct                                           22

<210> SEQ ID NO 7
<211> LENGTH: 25
<212> TYPE: DNA
<213> ORGANISM: Artificial Sequence
<220> FEATURE:
<223> OTHER INFORMATION: Primer DSV691-F

<400> SEQUENCE: 7
ccgtagatat ctggaggaac atcag                                        25

<210> SEQ ID NO 8
<211> LENGTH: 25
<212> TYPE: DNA
<213> ORGANISM: Artificial Sequence
<220> FEATURE:
<223> OTHER INFORMATION: Primer DSV826-R

<400> SEQUENCE: 8
acatctagca tccatcgttt acagc                                        25

<210> SEQ ID NO 9
<211> LENGTH: 20

```
<212> TYPE: DNA
<213> ORGANISM: Artificial Sequence
<220> FEATURE:
<223> OTHER INFORMATION: Primer DSF205F

<400> SEQUENCE: 9
aaccttcggg tcctactgtc                                         20

<210> SEQ ID NO 10
<211> LENGTH: 20
<212> TYPE: DNA
<213> ORGANISM: Artificial Sequence
<220> FEATURE:
<223> OTHER INFORMATION: Primer DSF1033R

<400> SEQUENCE: 10
gccgaactga cccctatgtt                                         20
```